Jan. 9, 1940.　　　　I. KAPLAN　　　　2,186,643
MIRROR AND PICTURE FRAME
Filed Aug. 24, 1938　　　2 Sheets-Sheet 1
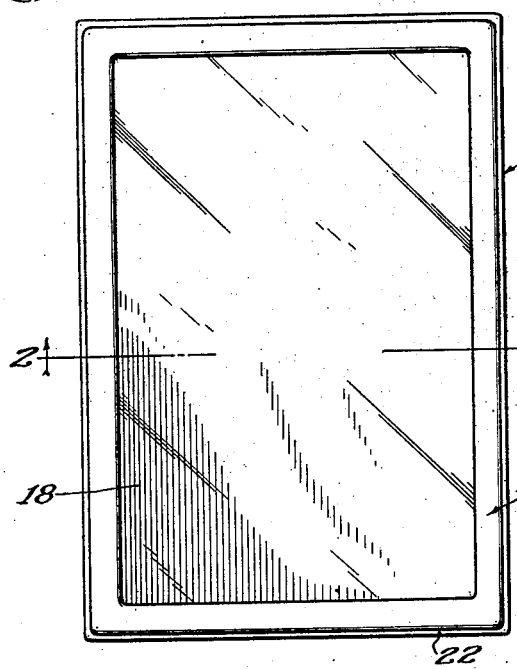
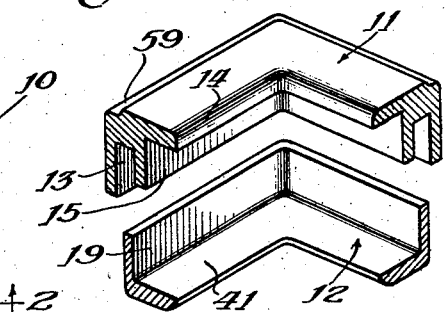
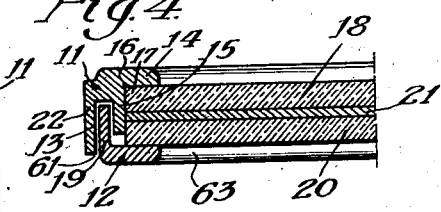
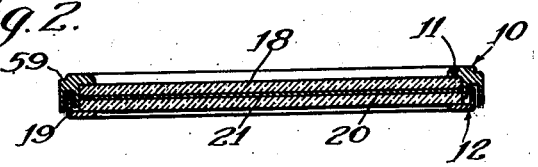
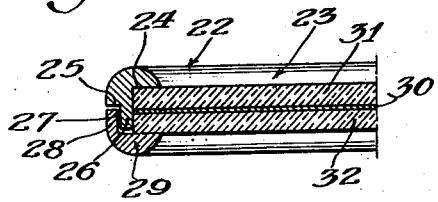
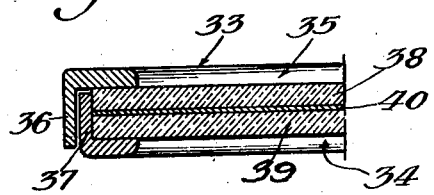
Inventor:
Isadore Kaplan,
By Belt, Wallace & Cannon
Attorneys Jan. 9, 1940.　　　　　I. KAPLAN　　　　　2,186,643
MIRROR AND PICTURE FRAME
Filed Aug. 24, 1938　　　2 Sheets-Sheet 2
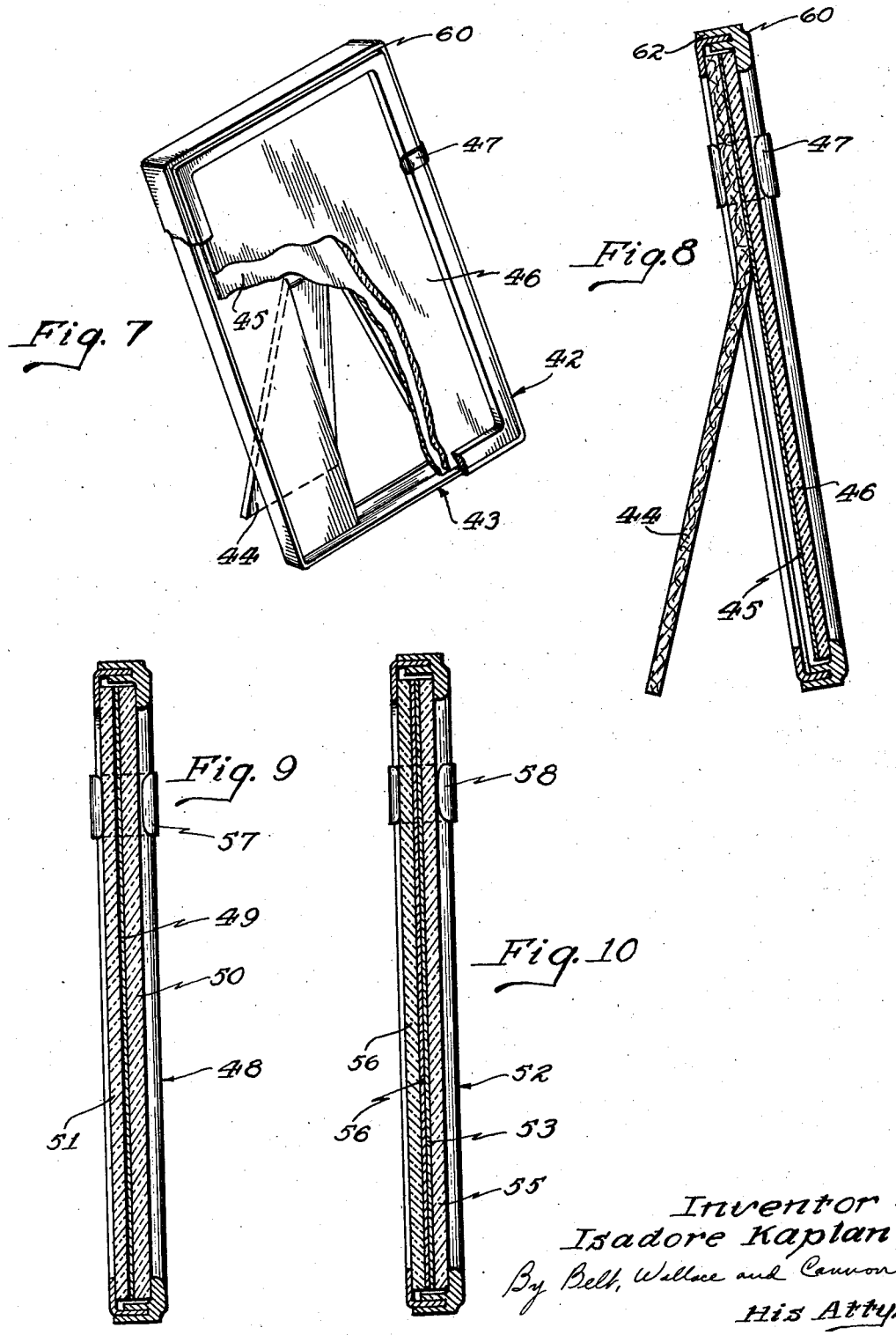
Inventor
Isadore Kaplan
By Bell, Wallace and Cannon
His Attys Patented Jan. 9, 1940

2,186,643

UNITED STATES PATENT OFFICE 2,186,643

MIRROR AND PICTURE FRAME

Isadore Kaplan, Chicago, Ill.

Application August 24, 1938, Serial No. 226,505

3 Claims. (Cl. 40—154)

This invention relates to mirror and picture frames.

An object of the present invention is to provide a frame, which is especially adapted for holding pictures, mirrors and the like, of the plain as well as the easel type, and which is so constructed and arranged that when the parts of the frame are assembled the side walls of the frame present an appearance of continuity in the marginal edges of the frame, thus imparting a neat, attractive appearance to the new frame and eliminating the unsightly appearance of the prior art frames in which the frame have usually been joined together midway of the side edges of the frame, thus providing an unsightly joint line extending around the frame.

Another object of the invention is to provide a new and improved two-piece frame, preferably made of molded plastic material, for use as a mirror or picture frame, or as a frame for so-called "photo-mirrors", that is, for mirror articles which embody one or more transparent or light-penetrable mirrors having a photograph or other image associated therewith, that is, arranged at the rear of the mirrored surface in the case of a single mirror or between the two mirrors in the case of such a mirror article embodying two mirrors.

Another object of the present invention is to provide a new and improved two-piece frame for pictures or the like and which is so constructed that the unsightly division or joint lines of many, if not all, of the prior art types of frames of an analogous character is eliminated, and a frame construction is provided which is neat and attractive in appearance.

Another object of the present invention is to provide a new and improved two-piece mirror or picture frame which, consisting as it does, of only two pieces of molded material, is possessed of greater structural strength than the prior art frame of an analogous nature and which have generally been constructed of four or more parts joined together at the corners or at the corners along the sides, that is, between the side edges thereof.

Another object of the present invention is to construct and arrange the new frame in such a manner that it may be used in a number of different ways such, for example, as an easel frame supporting a single photograph or picture; for supporting a picture or photograph and a mirror and hence adapted to be carried on the person as a combination pocket mirror and photograph; and for supporting two pictures or photographs, back to back.

A further object of the present invention is to construct the new frame in such a manner that the two complementary or interfitting parts thereof may be detachably joined or held together by means of spring clips or other suitable fastening elements such, for example, as gummed tape, an interfitting snap or frictional fit, and the like and without the necessity for or use of fastening elements such as nails, brads, or the like.

Another object of the present invention is to construct the new mirror or picture frame in such a manner that both the front and rear sides thereof are substantially similar in design and appearance and hence may be used interchangeably, that is to say, either side may be used or considered as the front or as the back.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a plan view of a mirror article or so-called "photo-mirror" embodying a preferred form of the new frame;

Fig. 2 is a transverse sectional view, on line 2—2 in Fig. 1;

Fig. 3 is a fragmentary exploded sectional view of the two parts of that form of the new frame which is illustrated in Figs. 1 and 2 and showing the construction thereof;

Fig. 4 is an enlarged fragmentary sectional view showing the frame parts illustrated in Fig. 3 with a picture, photograph or other image arranged therebetween;

Fig. 5 is a fragmentary sectional view, similar to Fig. 4, but showing a modified form of the new frame;

Fig. 6 is a fragmentary sectional view, similar to Fig. 6, but showing another modified form of the new frame;

Fig. 7 is a perspective view illustrating a typical use of the new frame, a part of the glass and picture being broken away to reveal the construction and arrangement of the easel;

Fig. 8 is a central, vertical longitudinal sectional view of the new frame used in the manner which is illustrated in Fig. 7;

Fig. 9 is a central vertical sectional view illustrating another use of the new frame; and Fig. 10 is a central vertical sectional view illustrating still another use of the new frame.

A preferred form of the new frame is illustrated in Figs. 1 to 4, inclusive, is therein generally indicated at 10, and comprises two interfitting frame parts 11 and 12 each of which is made in one continuous piece, the same preferably being molded from suitable moldable plastic material of the character which may now readily be purchased on the market.

It will be noted, by reference to Figs. 1 to 4, inclusive, that the body of the frame part 11 is provided with a groove or channel 13 which extends entirely around the frame part 11, this groove or channel opening upon the inner side or inner edge of the frame part 11. Accordingly, by reason of this groove 13 the frame part 11 will be referred to hereinafter as the female frame part, and the frame part 12 will be referred to hereinafter as the male frame part, for reasons which will presently appear.

It will likewise be noted, by reference to Figs. 1 to 4, inclusive, that the body of the female frame part 11 is provided with an overhanging flange 14 which projects right-angularly inwardly relative to and from the inner side wall 15 of the groove 13, thus providing a rabbeted corner 16, between the side wall 15 and the flange 14, for the reception of the marginal edge portions 17 of a pair of transparent or light-penetrable mirrors 18 and 20.

The male frame part 12 includes a marginal flange 19 which projects right-angularly inwardly, relative to and from, the body of the male frame part 12, and this flange 19 is adapted to be projected into the groove 13 when the frame parts 11 and 12 are assembled in a manner which will be set forth presently.

The form of the new frame which is illustrated in Figs. 1 to 4, inclusive, of the drawings, while capable of being used in any and all of the various ways in which analogous picture or mirror frames may be used, is shown as being used as a picture or "photo-mirror" frame, that is to say, the member 18 and the corresponding member 20 may be either transparent, that is, light-penetrable mirrors, as in the case of a so-called "photo-mirror", or the glass members 18 and 20 may be plain pieces of glass, as in the case where the new frame is used as a picture frame, and in either event the intermediate picture-bearing element or image 21 may be a picture, photograph or the like.

It will be noted that the parts 11 and 12 of the new frame are assembled by arranging the two glass sheets or mirrors 18 and 20, with the intermediate picture-bearing element 21 therebetween, in the corner which is provided in the space which is formed by the inwardly projecting marginal flange 14 of the female frame part 11, the body 41 of the male frame part 12, and the side wall 15 of the groove 13, as best shown in Fig. 4, and with the inwardly projecting marginal flange 19 of the male frame part 12 projecting into the groove 13 in the female part 11, wherein the flange 19 of the male frame part 12 may be secured in any desired manner, as by means of a suitable adhesive, or otherwise.

Accordingly, when the two interfitting male and female frame parts 12 and 11, respectively, of the new frame 10 are arranged in the manner shown in the drawings, the outer wall or marginal edge 22 of the female frame part 11, and its groove 13, projects along the outer side of the flange 19 of the male frame part 12, and substantially throughout the entire extent of the latter, and cooperates with the inner wall 15 of the groove 13 to hold the flange 19 of the male frame part 12 in position of use and against lateral movement or displacement.

It will be noted, therefore, that when the new two-piece frame is assembled and used in the manner which is illustrated in Figs. 1 to 4, inclusive, of the drawings, a frame construction is provided which, consisting as it does, of only two parts, is possessed of relatively great structural strength and resistance against bending and loosening of parts, a difficulty which has been experienced in many, if not all, of the prior art mirror and picture frames which have consisted, in general, of two parts each consisting of four or more wooden pieces joined together at the corners thereof, and with the two parts joined together midway of the front and rear sides of the marginal edges of the frame.

It will likewise be noted that the new two-piece frame is neat and attractive in appearance, a factor which is of relatively great importance in an article of this character, since it is devoid of the objectionable and unsightly appearance caused by joints at the corners and along the sides of the frame, which has been an objectionable feature in many, if not all, of the prior art frames, as explained above.

A modified form of the new mirror or picture frame as illustrated in Fig. 5, is therein generally indicated at 22, and comprises a female frame part 23, which is provided with a rabbeted corner 24, which is similar to the rabbeted corner 16 in the female part 11.

In this form of the invention, however, the female frame part 23 differs in construction from the female frame part 13, in the form of the invention which is illustrated in Figs. 1 to 4, inclusive, and is provided, on the outer surface thereof, with a marginal groove 27 into which a correspondingly-shaped marginal flange 28 on the male frame part 29 is adapted to be projected; it being understood that the flange 28 on the male frame part 29 may be secured in the groove 25 in the female frame part in any suitable manner, as by means of a suitable adhesive, or otherwise.

The modified form of the invention which is illustrated in Fig. 5 may be used in any of the ways in which the preferred form of the new frame which is illustrated in Figs. 1 to 4, inclusive, may be used, that is, for retaining a picture-bearing element 30 or the like either between a pair of light-penetrable mirrors 31 and 32 or between a pair of glass plates which may be substituted for such mirrors. Accordingly, when so used the modified form of the new two-piece frame which is shown in Fig. 5 has all of the advantages of structural strength and resistance to distortion which are embodied in the preferred form of the invention which are illustrated in Figs. 1 to 4, inclusive, except that it is not as neat and attractive in appearance as the preferred form of the new frame which is illustrated in Figs. 1 to 4, inclusive, due to the joint in the side wall thereof, between the flange 28 of the male frame part 29 and the correspondingly-shaped groove 25 in the female frame part.

Another modified form of the new two-piece frame is illustrated in Fig. 6 of the drawings, as therein shown is generally indicated at 33, and comprises a male frame part 34 and a female frame part 35. The female frame part 35 includes a marginal flange 36 and the male frame part includes a similar but oppositely extending marginal flange 37, the male frame part, in this form of the invention, being smaller than the female frame part so as to fit into the latter. Otherwise, however, the male and female frame parts 34 and 35 are substantially similar in construction, (except as stated above that the female frame part 35 is somewhat larger in size than the male frame part 34), so that when the two frame parts 34 and 35 are assembled in position of use, as in Fig. 6, the side wall or marginal flange 36 of the female frame part 35 extends down over the side wall or marginal flange 37 of the male frame part 34, and substantially throughout the entire length of the said flange 37, as shown in Fig. 6.

It will be understood, in this connection, that the two frame parts 34 and 35, which are shown in Fig. 6, may be joined together in any desired manner, as by means of a suitable adhesive, or otherwise, and when the frame parts are so assembled and used they cooperate to provide a two-piece frame which is possessed of relatively great structural strength and resistance to distortion or bending, and may be used in any and all of the ways in which the frame shown in Figs. 1 to 4, inclusive, of the drawings may be used, as, for example, to enclose a pair of light-penetrable mirrors or plain pieces of glass 38 and 39 having a picture-bearing element or the like 40 arranged therebetween.

It will also be noted, in this connection, that the modified form of the invention which is shown in Fig. 6 also has the advantage of neatness and attractiveness in appearance, which is present in the preferred form of the invention which is illustrated in Figs. 1 to 4, inclusive, due to the absence of a joint line around the marginal edge thereof and between the front and rear sides of the frame.

A typical use of the new frame is shown in Fig. 7, as therein shown is generally indicated at 42, and comprises a two part frame, which is generally indicated at 43, and which may be of the type illustrated in Figs. 1 to 4, inclusive, or the form shown in Fig. 5 or the form shown in Fig. 6.

In the use of the new frame which is illustrated in Figs. 7 and 8 the same is used in conjunction with an easel support 44, which is arranged at the back thereof, and the frame and easel cooperate to support a single picture or photograph 45 which is arranged behind a transparent glass plate 46; the assembly of the two frame parts, the easel back or support 44, the picture or photograph 45 and the transparent glass plate 46 being detachably held together by means of substantially U-shaped spring metal clips 47 which are designed and arranged in the manner shown and which may be readily removed from and inserted into position of use, as shown, so as to adapt the frame to either of the two uses which are illustrated in Figs. 9 and 10, or to analogous uses. These spring clips are preferably slidably mounted on the frame parts so that they may be adjusted to the proper and desired positions.

It is to be understood, in this connection, that preferably two of the spring clips are used to retain the assembly shown in Figs. 7 and 8, or the assemblies shown in Figs. 9 and 10, together, there being preferably one clip 47 on each side of the frame and one clip being preferably arranged adjacent the top and the other clip being preferably arranged adjacent the bottom of the frame.

Another use of the new frame is illustrated in Fig. 9 wherein the frame is generally indicated at 48, and is shown as retaining a photograph or picture 49, which is arranged behind a transparent glass plate 50; a mirror 51 being arranged behind the photograph or picture 49, so that the assembly thus provided forms a combination pocket mirror and photograph or picture frame.

Another typical use of the new frame is shown in Fig. 10, wherein the frame is generally indicated at 52 and is shown as retaining two pictures or photographs 53 and 54 back to back, there being two transparent glass plates 55 and 56 held by the frame, one in front of each of the pictures or photographs 53 and 54.

It will be noted that the assemblies shown in Figs. 9 and 10 are likewise detachably or separably held together by means of spring clips 57 and 58, respectively, which are identical to the spring clips 47, so that the assemblies shown in Figs. 9 and 10 may be readily taken apart and the new frame used for one of the other purposes, or in one of the other ways which are illustrated in the drawings.

While the spring clips 47, 57 and 58 provide a very satisfactory means for detachably or separably holding the two parts of the frame together, other fastening means such, for example, as transparent Celluloid Scotch tape, or an interfitting snap or frictional fit, may be used, if desired.

In order that the two sides of the new mirror or picture frame may be used interchangeably, that is, so that either side may be considered as the front or as the back, a marginal groove 59 is provided in one of the two frame pieces, in the form of the invention which is shown in Figs. 1 to 4, inclusive, and a similar groove, as 60, may be provided in the form of the invention which is shown in Figs. 7 and 8, as well as in the other forms of the invention which are shown in the drawings, and it will be noticed that these grooves 59 and 60 closely resemble the grooves 61 and 62, respectively, which are formed on the opposite side of the frame by reason of the fact that the side wall, as 22, of the frame part 11 terminates slightly inwardly of the side wall 63 of the frame part 12. This feature imparts substantially the same appearance to both sides of the frame so that either side may be considered as the front or as the back and this facilitates the various arrangements and uses of the new frame which are illustrated in the drawings and especially in Figs. 7 to 10 inclusive, thereof.

While I have illustrated and described the preferred forms of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

I claim:

1. A frame for the display of plates such as mirrors, pictures or the like having display openings in its opposite faces, comprising a first member, the inner side wall and the back of the face portion of which form a recess to receive the edges of the plates, a channel between said inner side wall and the outer side wall of said member, the portion of said side wall which forms the partition between said recess and said channel being of less depth than the outer side wall of said member, the side wall of said member and the face portion thereof joining at a re-entrant angle to form a shoulder, a second member of generally L-shaped cross section, the side wall of which enters the channel of said first member and the face portion of which clamps the plates in the recess of said first member, the side wall of said second member having a sufficient width and said second member having an overall dimension sufficiently less than the overall dimension of said first member to produce a shoulder adjacent the end of said side wall of said first member corresponding to the shoulder formed by the juncture of the side wall and face portion of said first member, whereby said first and second members when assembled form a symmetrical two faced frame, and means for securing said members in assembled relation.

2. A frame for the display of plates such as mirrors, pictures or the like having display openings in its opposite faces, comprising a first member of molded plastic material, the inner side wall and the back of the face portion of which form a recess to receive the edges of the plates, a channel between said inner side wall and the outer side wall of said member, the portion of said side wall which forms the partition between said recess and said channel being of less depth than the outer side wall of said member, the side wall of said member and the face portion thereof joining at a re-entrant angle to form a shoulder, a second member of molded plastic material and of generally L-shaped cross section, the side wall of which enters the channel of said first member and the face portion of which clamps the plates in the recess of said first member, the side wall of said second member having a sufficient width and said second member having an overall dimension sufficiently less than the overall dimension of said first member to produce a shoulder adjacent the end of said side wall of said first member corresponding to the shoulder formed by the juncture of the side wall and face portion of said member, whereby said first and second members when assembled form a symmetrical two faced frame, and means for securing said members in assembled relation.

3. A frame for the display of plates such as mirrors, pictures or the like having display openings in its opposite faces, comprising a first member, the inner side wall and the back of the face portion of which form a recess to receive the edges of the plates, a channel between said inner side wall and the outer side wall of said member, the portion of said side wall which forms the partition between said recess and said channel being of less depth than the outer side wall of said member, the side wall of said member and the face portion thereof joining at a re-entrant angle to form a shoulder, a second member of generally L-shaped cross section, the side wall of which enters the channel of said first member and the face portion of which clamps the plates in the recess of said first member, the side wall of said second member having a sufficient width and said second member having an overall dimension sufficiently less than the overall dimension of said first member to produce a shoulder adjacent the end of said side wall of said first member corresponding to the shoulder formed by the juncture of the side wall and face portion of said first member, whereby said first and second members when assembled form a symmetrical two faced frame, and U-shaped spring clamps embracing said members and detachably securing them in assembled relation.

ISADORE KAPLAN.